INVENTOR
PAUL S. BACH
EDWARD R. CLARK
BY Henry E Otto Jr
ATTORNEY

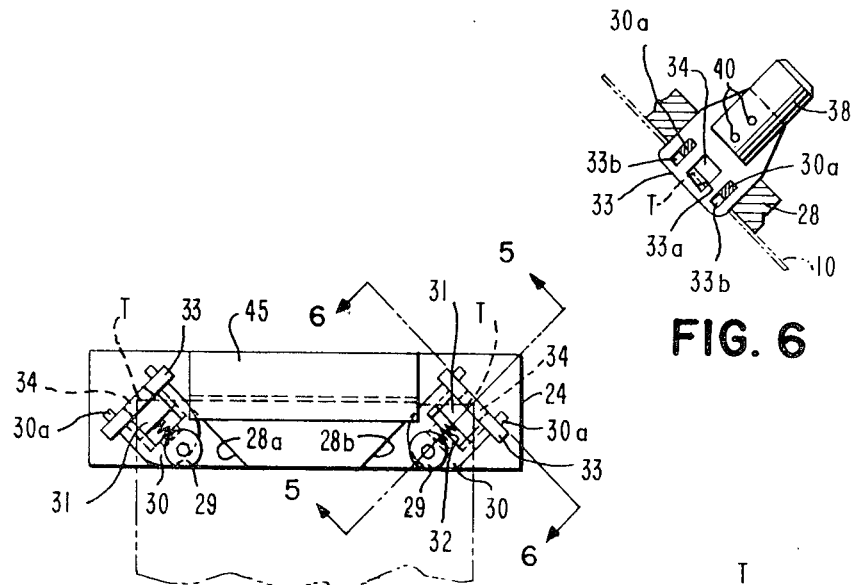
FIG. 6
FIG. 4
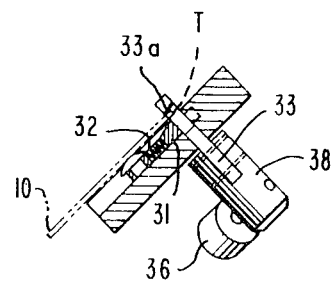
FIG. 5
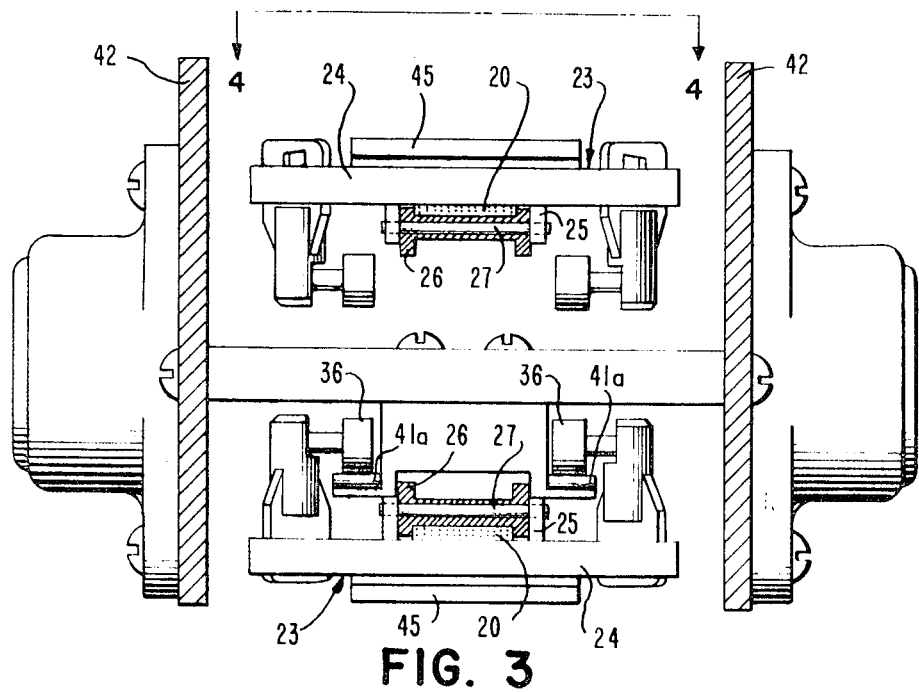
FIG. 3

United States Patent Office 3,623,386
Patented Nov. 30, 1971

3,623,386
HIGH THROUGHPUT ON-THE-FLY CARD CUTTING APPARATUS
Paul S. Bach, Lakewood, and Edward R. Clark, Long Branch, N.J., assignors to International Business Machines Corporation, Armonk, N.Y.
Filed Mar. 20, 1970, Ser. No. 21,324
Int. Cl. B23d 25/04
U.S. Cl. 83—151
10 Claims

ABSTRACT OF THE DISCLOSURE

Tabulating cards or the like are cam released in succession from gripper clips carried by an endless belt and caused to drop tail-edge-first a slight distance by gravity to register in respective card-receiving areas or pockets uniformly spaced along an endless means that moves in a path adjacent that of said belt at the time of card release. At each such pocket is a respective cutting tool comprising a movable blade that is moved in a direction perpendicular to the path of said endless means by engagement of a cam follower with a cam surface to cut beveled corners on the trailing edges of each card. After these corners have been cut, the endless means starts to carry the tool in a curved path around a hub. Due to the resultant temporary acceleration of the tool, the leading edge of each successive card is driven back up and into registry under the gripper clip from which it had been released during the cutting operation while the trailing edge is still supported by the pocket; and as the leading edge registers within the jaw of the clip, a cam recloses the clip to regrip the card so that it will once again be advanced solely under the control of said endless belt.

---

This invention relates to high throughput apparatus for performing a desired work operation on successive discrete flat articles. More particularly it relates to apparatus comprising a plurality of similar tool units carried by an endless means so as to be able to perform the work operation on a plurality of flat articles, such as tabulating cards, concurrently in a stage-by-stage sequence.

BACKGROUND OF THE INVENTION

In the conventional Carroll rotary press for manufacture of tabulating cards, it is customary to perform some on-the-fly tooling operations, such as scoring, on a moving web of cardstock prior to printing and to perform others, such as corner slash cut, after the card has been printed and cut to length. Where operations are performed on the web, for example by rotary punch and die cylinders, alignment is critical and must be precisely controlled. As attempts are made to increase web speeds, the increased acceleration and cutting forces caused by reduction in punching or cutting cycle time result in increased wear and maintenance costs. There is a need for a modified press that will enable throughput to be increased considerably from the present maximum of 2,000 cards per minute to at least 3,000 without undesirable increases in maintenance costs and wear.

SUMMARY OF THE INVENTION

Toward this end, and according to the invention, there is provided an improved apparatus which receives the cards after they have been cut to length and performs a desired work operation thereon (such as cutting beveled corners on the trailing edges) in a stage-by-stage sequence; i.e., the work operation is initiated on one card by one set of tools while similar work operations in differing degrees of progress are being completed by other sets of identical tools. As the work operation is completed on each card in succession, it is transferred back to the main flow path. It is contemplated that the embodiment herein disclosed for sake of illustration to bevel the trailing corners of the card would be employed in association with means forming no part of the present invention to increase to a corresponding degree the rate at which other work operations are performed on the card (e.g., a beveled corner and slash cut simultaneously applied to the leading edge of the card, preferably downstream of the apparatus herein disclosed).

Other objects, features, and advantages will become apparent from the following more detailed description of the invention and from the accompanying drawings, wherein:

FIG. 3 is a sectional view taken along the line 3—3 of FIG. 2;

FIG. 4 is a view taken along the line 4—4 of FIG. 3;

Figure 1:
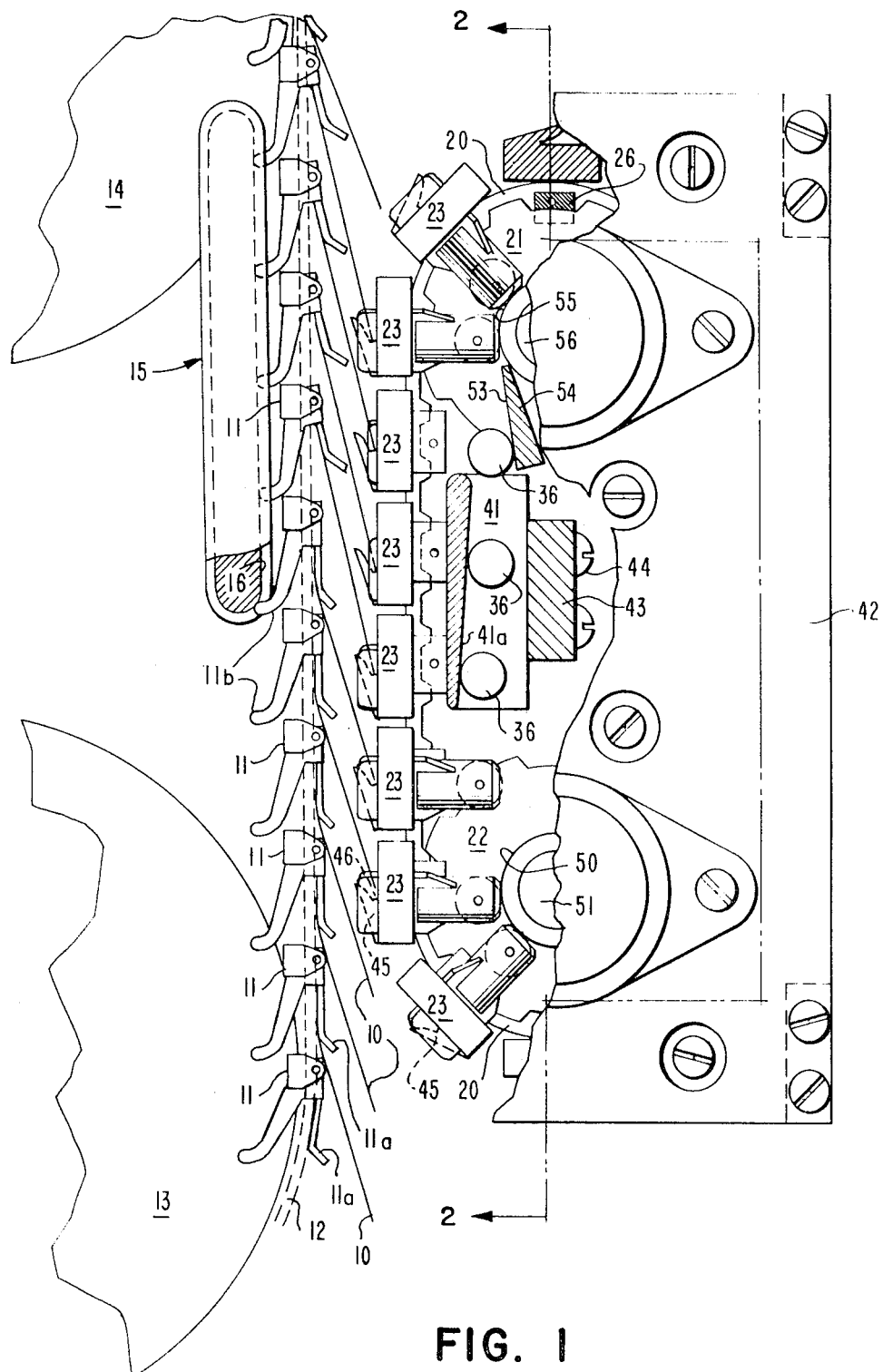
FIG. 1 is a side elevational view, partially in outline and partially in section, of a portion of a card manufacturing apparatus embodying the invention.
Figure 7:
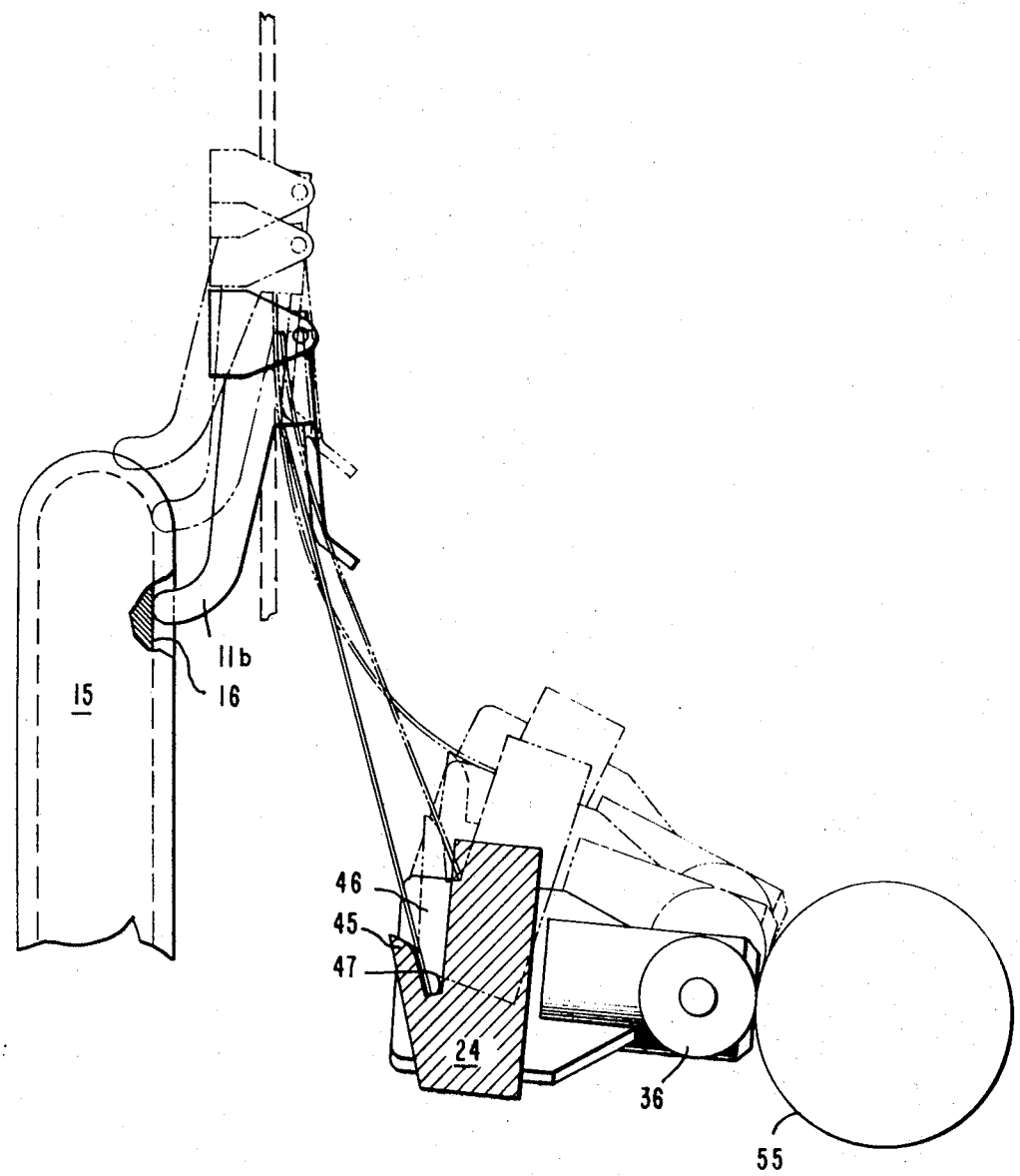
Figure 8:
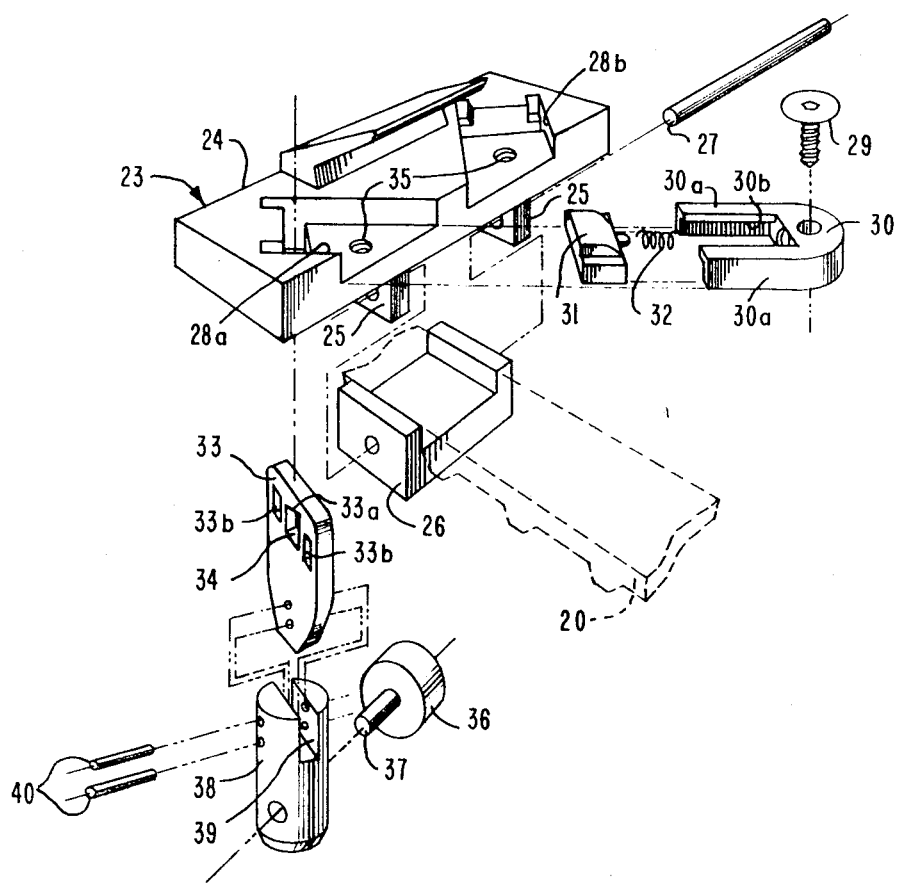

FIGS. 5 and 6 are sectional views taken along the lines 5—5 and 6—6, respectively, of FIG. 4;

FIG. 7 is a fragmentary view, to enlarged scale, of a portion of the apparatus shown in FIG. 1, illustrating by phantom lines the sequence of positions of a card-receiving pocket and card-gripping clip; and FIG. 8 is an exploded perspective view, to enlarged scale, of a tool unit forming part of the apparatus.

DESCRIPTION

Referring to FIG. 1, after cards 10 with four square corners have been printed upon and severed from a web by suitable means (not shown) in a rotary card press, they are fed successively in conventional fashion into the jaws of respective clips 11. As illustrated, these clips are carried by and spaced equal distances along an endless suitably driven belt 12. Each clip 11 is spring-biased to a gripping or closed position in which the leading edge of each card is pinched between a wedge-shaped tip 11a and the belt 12. Belt 12 carries the cards along a prescribed endless path defined in part by two vertically spaced wheels 13, 14 about which the belt is entrained. Along and beside the upward vertical run of the belt 12 is an elongated cam 15 providing a cam surface 16. When a tail 11b of each clip 11 engages surface 16, the clip is pivoted counterclockwise to an open position, in which tip 11a releases the leading edge of the card 10.

According to the invention, an endless timing belt 20 is entrained around two timing pulleys 21, 22. The axes of pulleys 21, 22 are spaced closer than, but parallel to, the axes of the wheels 13, 14; and the vertical run of belt 20 is parallel to the vertical run of belt 12, with the tips 11a and shingled cards 10 projecting therefrom being adjacent a plurality of tool units 23 that are carried by belt 20. These tool units, which perform the desired work operation, are spaced along belt 20 with a pitch that matches the pitch of the clips 11 along belt 12. Upper pulley 21, which is suitably driven from the power train (not shown) of the press, drives belt 20 at a lineal velocity that is the same as that of belt 12.

Figure 2:
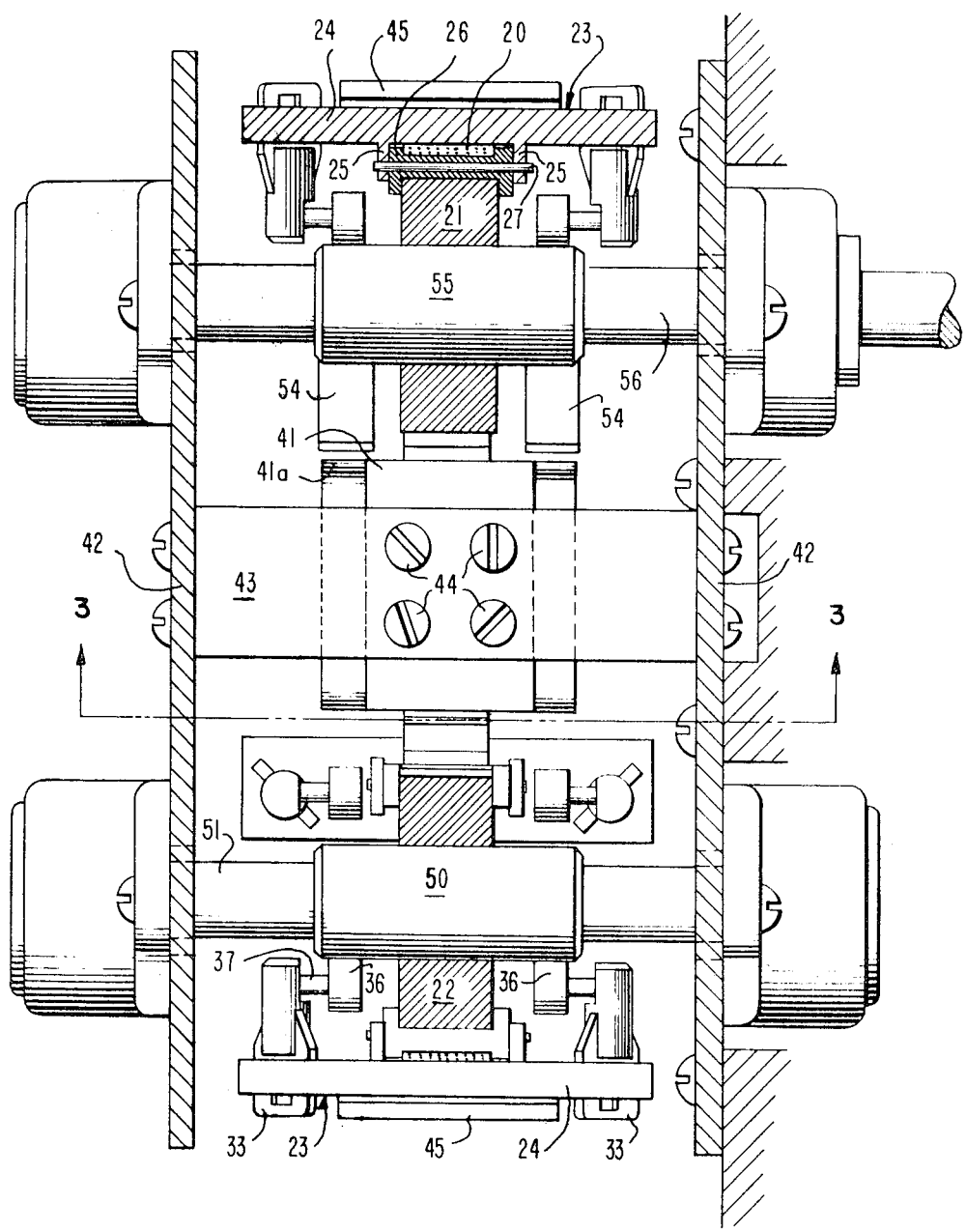
FIG. 2 is a sectional view taken along the line 2—2 of FIG. 1.

As best shown in FIGS. 2, 3 and 8, each tool unit 23 comprises a generally flat rectangular tooling platform 24 with laterally spaced depending ears 25 between which is inserted a clamping plate 26. A locking bar 27 projects through aligned bores in the plate 26 and ears 25 to compress the timing belt 20 against the underside of platform 24 so the platform will be rigidly clamped to and moved by said belt. The belt 20 is internally cogged to mesh with the cogged pulleys 21, 22 (see FIG. 1);

and the platforms 24 are clamped to the thick ribs of the belt.

As best shown in FIG. 8, each platform 24 has a pair of similar but divergent cut-out portions 28a, 28b in each of which is removably secured, as by a screw 29, a U-shaped carrier 30. The outer long edges of the vertical legs 30a of each carrier have a flush fit within a respective cut-out portion 28a or 28b; whereas a blade 31 is slidably retained within a stepped track or channel 30b formed in and defined by the parallel inner long edges of the U.

Nesting in the base of the "U" of carrier 30 is a helical spring 32, that biases blade 31 toward the open end of the U into constant contact with the side of another generally flat blade 33 that is movable in a plane perpendicular to that of blade 31. Blade 33 has an aperture 34 which is rectangular except for its fourth side, which is angled slightly to define a movable cutting edge 33a. This assures a progressive scissor-like shearing cut as edge 33a wipes upwardly past spring-loaded blade 31 to cut card 10 in the manner presently to be described.

Blade 33 also has two elongated slots 33b to either side of aperture 34. The two legs 30a of the U-shaped carrier 30 project through these slots 33b; and screw 29 is inserted through carrier 30 into a respective tapped hole 35 in platform 24. This is to provide a lost-motion connection between carrier 30 and blade 33 that will permit blade 33 to move up and down relative to blade 31 and also confine blade 31 (which is wider than aperture 34) within channel 30b.

Blades 33 project outwardly through rectangular openings extending through the cut-out portions 28a, 28b, respectively, in platform 24. As above noted, movement is limited by contact of the carrier legs 30a with the ends of the respective slots 33b. Movement is effected by a roller-type cam follower 36 that is rotatably mounted on a shaft 37 that is screw-thread connected to a cylindrical member 38 having a clevis-like slit 39 which receives the non-apertured end of blade 33; and a pair of pins 40 stake the blade 33 to member 38.

Each roller follower 36, in turn, rides over a cam surface 41a provided by a cam plate 41 (see FIG. 2) that is suitably mounted to parallel support channels 42 of the press frame by a plate 43 and screws 44.

As best shown in FIG. 7, each platform 24 has an integrally formed outwardly projecting divergent ledge 45 to define between it and the flat part of the outer surface platform a card-receiving pocket or area 46 having a transversely extending edge 47 against which the trailing edge of each card 10 can register, for reasons now to be explained.

OPERATION

Assume initially that the cardstock has been printed upon, cut to desired length to create the square-edged tabulating cards 10; that said cards have been advanced through a drier section (not shown) in conventional fashion by belt 12 to which they are individually clipped in shingled fashion by clips 11; and that the cards after drying are now being advanced upwardly by belt 12 alongside the tool units 23 which are also being moved upwardly by belt 20, as shown in FIG. 1.

As the lowermost tool unit 23 is moved upward in the curved path defined by contact of rollers 36 with the circumference of boss 50 (see FIGS. 1 and 2) on the idler shaft 51 for pulley 22 and belt 20, the ledge 45 and pocket 46 will be accelerated since they project radially outward beyond the belt. Thus as shown in FIG. 1, pocket 46 of a respective tool unit 23 will catch up to the trailing edge of a card 10. Then, as the pocket 46 is moved vertically by belt 20, tail 11b of the clip 11 which holds that particular card will strike cam surface 16, causing clip 11 to be forced open and release the card. While the leading edge of the card is loosely confined under the spread tip 11a, the trailing edge of the card will settle within the pocket 46, with its trailing corners T (see FIGS. 4–6) projecting into apertures 34 in the respective blades 33.

Meanwhile, as the leading edge of the card 10 is being released by clip 11 under the action of cam surface 16, the rollers 36 of the tool unit 23 whose pocket 46 has already captured the trailing edge of that card will be advanced by belt 20 to a point where they engage cam 41 (FIG. 1) and start to roll up along cam surface 41a. As rollers 36 are moved up along cam surface 41a, they will be cammed rightward as viewed in FIG. 1. Since the rollers 36 are rigidly connected to the blades 33 through the respective shafts 37, members 38 and pins 40 (FIG. 8), the blades will be moved operatively rightward by the rollers. As the blades 33 and hence cutting edges 33a are thus pulled rightward as viewed in FIG. 1 and caused to wipe past the spring-loaded stationary blades 31, the corners T will be sheared off to provide beveled corners with a progressive scissors-like action. Because of the angularity of each cutting edge 33a (FIGS. 6, 8), the progressive cut will be made starting from the opposite sides of card 10 toward and through the trailing edge, so the cutting forces will tend to drive the card downward to maintain it fully registered against edge 47 (FIG. 7). As rollers 36 reach the upper end of cam surface 41a, the blades 33 will be completing the cut. The rollers 36 will then preferably be advanced by belt 20 onto surface 53 of a reset cam 54 which will divert the rollers and hence the blades 33 leftward to their original or normal positions; whereupon the rollers will contact and roll around boss 55 on the drive shaft 56 for the pulley 21 and belt 20.

As rollers 36 roll around boss 55, the pocket 46 and edge 47 (see FIG. 7) will again be accelerated since they are radially outward of the center line of belt 20 (FIG. 1). As the velocity of edge 47 thus increases, edge 47 pushes on the trailing edge of the card, causing the leading edge of the card to be forced up into accurately registered position within the jaw of the open clip 11 (preferably with some slight bowing of the card), just as the tail 11b of the clip moves off the upper end of cam surface 16 and causes the tip 11a of said clip to snap clockwise into closed or gripping position. As the rollers 36 continue to move around boss 55, the trailing edge of the card will flex and snap past the ledge 45, while the card is firmly gripped at its leading edge by clip 11. This completes a full cycle of operation.

It will thus be apparent that work operations (such as cutting beveled corners on the trailing edges of a card) can be performed by releasing discrete flat articles from respective clips 11 on one belt 12 to a respective one of a series of tool units 23 carried by another belt 20. The tool units perform the work operation in successive stages over a predetermined period of time while similar work operations but displaced in phase are being initiated and/ or completed on adjacent articles. Then the articles are regripped and carried away by the first belt 12, as the second belt 20 continues to advance tool units 23 to perform work operations in successive stages on successive additional cards.

It will be apparent that various changes may be made without departing from the spirit, scope and teaching of the present invention. Accordingly, the apparatus herein disclosed is to be considered merely as illustrative, and the scope of the invention is to be limited only as specified in the claims.

We claim:

1. Apparatus for performing a desired work operation on successive discrete flat articles, comprising
    endless means movable at a substantially constant velocity in a prescribed path, said endless means having a plurality of article-receiving areas spaced therealong, each for receiving and advancing a respective one of the articles,
    a plurality of similar tool means carried by said endless means, and each associated with a respective one of said areas, means associated with each tool means and providing a follower extending within the area bounded by said endless means, and cam means providing a surface divergent from a straight run of said path and engagable by each follower for effecting controlled movement of each tool substantially perpendicular to said straight run successively toward and away from the article to perform the work operation thereon while the article is registered within a corresponding one of the areas.

2. Apparatus according to claim 1, wherein the areas extend outboard of the prescribed path of said endless means, such that as each area enters a convexly curved portion of the prescribed path, the consequent greater devial travel of its respective outboard portion causes the surface velocity of the latter temporarily to exceed said constant velocity for accelerating the article as it leaves the endless means.

3. Apparatus according to claim 2, including an endless belt or the like having a plurality of uniformly spaced gripper clips movable in a path adjacent said endless means and at a velocity synchronized therewith, and cam means for holding the jaws of each clip open as each article is accelerated and then permitting closure of such jaw to grip the leading edge of such article, whereby it will be transferred to and conveyed by said belt after completion of said work operation.

4. Apparatus according to claim 3, wherein the clips of said endless belt convey each article to said endless means, and said cam means opens each clip successively to release each article in succession so that it may nest by gravity in a corresponding one of said areas in the endless means, whereby there is a dual transfer of the article successively from and then back to said endless belt.

5. Apparatus according to claim 1, wherein the articles are tabulating cards, and each tool means comprises a cutting blade under control of a respective one of followers for performing a cutting operation on a selected portion of each card successively.

6. Apparatus according to claim 1, including an endless belt or the like having a plurality of gripper clips movable in a path adjacent said endless means at a velocity synchronized therewith, said articles being conveyed by said belt prior to reaching said endless means, and cam means for successively opening the jaws of each clip to release each article in succession so that it may nest by gravity in a corresponding one of said areas in the endless means.

7. Apparauts according to claim 6 wherein, as each article-receiving area enters a convexly curved portion of the prescribed path prior to the article being nested therein, its surface velocity temporarily exceeds said constant velocity for accelerating such area to cause it to catch up to and capture the trailing edge of the article to assure accurate registration and nesting thereof within such area.

8. Apparatus according to claim 1 wherein, the articles are tabulating cards carried in shingle fashion by the gripper clips on said belt, and said article-receiving areas are in part defined by ledges projecting angularly from the endless means, the distance between the clips and ledges being sufficiently short that the leading edge of each card is guided by and within an opened one of said clips throughout the period while the trailing edge of such card is in contact with the endless means.

9. Apparatus according to claim 1, including means for conveying each article to said endless means and releasing it in timed relation so that it may nest by gravity with its trailing edge registered in a corresponding one of said article-receiving areas.

10. Apparatus according to claim 1, including means for conveying each article to said endless means and releasing it in timed relation so that it may nest by gravity with its trailing edge registered in a corresponding one of said article-receiving areas, and wherein as each such area enters a convexly curved portion of the prescribed path, its surface velocity will temporarily exceed said constant velocity for accelerating the article so that its leading edge will catch up to and be recaptured by said conveying means, whereby said article will be received back by said conveying means after temporary transfer to said endless means.

References Cited

UNITED STATES PATENTS

| 835,055 | 11/1906 | Brooks | 83—326 UX |
| 2,984,138 | 5/1961 | Vitense et al. | 83—310 |
| 3,247,745 | 4/1966 | Bannon, Jr., et al. | 83—326 X |

FOREIGN PATENTS

| 249,966 | 8/1912 | Germany | 83—326 |

FRANK T. YOST, Primary Examiner

U.S. Cl. X.R,

83—155, 310, 325, 326